(12) United States Patent
Perciballi

(10) Patent No.: US 9,418,399 B1
(45) Date of Patent: Aug. 16, 2016

(54) HYBRID IMAGE CAMOUFLAGE

(71) Applicant: Armorworks Holdings, Inc., Chandler, AZ (US)

(72) Inventor: William J. Perciballi, Phoenix, AZ (US)

(73) Assignee: Armorworks Holdings, Inc., Chandler, AZ (US)

( * ) Notice: Subject to any disclaimer, the term of this patent is extended or adjusted under 35 U.S.C. 154(b) by 0 days.

(21) Appl. No.: 14/608,950

(22) Filed: Jan. 29, 2015

Related U.S. Application Data

(62) Division of application No. 13/494,519, filed on Jun. 12, 2012, now abandoned.

(51) Int. Cl.
*G06K 9/32* (2006.01)
*G06T 3/40* (2006.01)
*G06T 5/00* (2006.01)
*G06T 5/20* (2006.01)

(52) U.S. Cl.
CPC ............... *G06T 3/4038* (2013.01); *G06T 5/001* (2013.01); *G06T 5/20* (2013.01); *G06T 2207/10024* (2013.01); *G06T 2207/20221* (2013.01)

(58) Field of Classification Search
CPC ...... G06T 7/0028; F41H 3/00; Y10T 29/4973
USPC .......................................................... 382/294
See application file for complete search history.

(56) References Cited

U.S. PATENT DOCUMENTS

| 6,137,498 A | * | 10/2000 | Silvers ................... G06T 11/00 345/629 |
| 2009/0315907 A1 | * | 12/2009 | Kobayashi ........... G03G 21/043 345/581 |
| 2012/0132063 A1 | * | 5/2012 | Saucedo .................. F41H 3/00 89/36.02 |
| 2014/0022604 A1 | * | 1/2014 | Murakami ......... H04N 1/00838 358/300 |

\* cited by examiner

*Primary Examiner* — Ruiping Li
(74) *Attorney, Agent, or Firm* — James L Farmer

(57) ABSTRACT

Designs and methods are provided for a hybrid image camouflage comprising a micro camouflage pattern of primarily fine features and a macro camouflage pattern of primarily coarse features. The patterns may be combined such that the appearance of the micro pattern predominates at close range, and the appearance of the macro pattern predominates at long range.

15 Claims, No Drawings

HYBRID IMAGE CAMOUFLAGE

This application is a divisional of U.S. Utility application Ser. No. 13/494,519, filed Jun. 12, 2012, the entire contents of which are hereby incorporated by reference.

TECHNICAL FIELD AND BACKGROUND

The present invention generally relates to camouflage designs and patterns for concealment of persons or objects in various surroundings.

DESCRIPTION OF THE EMBODIMENTS

The instant invention is described more fully hereinafter in one or more exemplary embodiments. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

In one embodiment an exemplary hybrid image camouflage comprises a composite image that defines a first, micro appearance or pattern when viewed at close range, and a second, macro appearance or pattern when viewed from long range. The macro pattern may be a larger version of the micro pattern, or a different pattern completely. The meaning of close range and long range with respect to the micro and macro patterns is generally dependent upon the particular application, and the anticipated range of distances over which a camouflage effect is desired. For example, it may be desirable for a soldier's camouflage to provide effective concealment at distances in the range of 30 feet to 300 feet. On the other hand, large vehicles such as trucks or tanks may benefit from concealment over much larger distances, such as over a range of several hundred to several thousand feet.

A hybrid image camouflage of the present invention may be configured such that the distance associated with the micro camouflage pattern corresponds generally to the low end of the desired concealment range, and the distance associated with the macro camouflage pattern corresponds generally to the high end of the desired concealment range. Taking for example the previously mentioned soldier with a desired concealment range of 30 feet to 300 feet, an optimal distance associated with the micro camouflage pattern could be 60 feet for example, while the optimal distance associated with the macro camouflage pattern could be 250 feet. It should be noted that references herein to ranges or distances associated with a camouflage pattern, unless otherwise specifically noted, should not necessarily be interpreted as defining an exact distance.

The technique known as hybrid images produces static images with two interpretations which change as a function of viewing distance. A hybrid image camouflage may be generated by superimposing two camouflage images or patterns at two different spatial scales, one relatively coarse and the other relatively fine. The contrasting spatial scales may be obtained by filtering one image with a low-pass filter, creating a low spatial scale pattern or image; and filtering the second image with a high-pass filter, creating a high spatial scale pattern or image. The final image is composed by essentially adding these two filtered images. Expressed in mathematical terms, a hybrid image camouflage (HC) may be obtained by combining two camouflage images ($I_1$ and $I_2$), one filtered with a low-pass filter ($F_1$) and the other filtered with a high-pass filter ($1-F_2$). Thus, $HC=I_1 \times F_1+I_2 \times (1-F_2)$, wherein the operations are defined in the Fourier domain.

The distance at which each component of a hybrid camouflage image is best seen and the distance at which the hybrid percept alternates can be fully determined as a function of the image size and the cutoff frequencies of the filters (expressed in cycles/image). In particular, the hybrid image camouflage comprises a frequency cut associated with the low resolution image, $I_1$ (the macro pattern), and a frequency cut associated with the high resolution image, $I_2$ (the micro pattern). An additional parameter can be added by introducing a different gain for each frequency channel. In one exemplary embodiment, the gain is set to 1 for both spatial channels, and the cut-off frequency of each filter defined as the frequency for which the amplitude gain of the filter is $\frac{1}{2}$.

In addition, the micro and macro patterns may be preferentially selected and arranged such that the perception of neither dominates or overly influences perception of the other. In one embodiment, grouping cues in the low spatial frequency pattern are minimized relative to grouping cues in the high spatial frequency pattern to avoid perception of the macro pattern at the micro viewing range. For example, grouping cues in the macro pattern may be minimized by avoiding symmetry and repetitiveness in the low spatial frequencies.

In another example, the influence of one spatial channel over another is minimized by introducing accidental alignments. For example, the filtered micro and macro images may be preferentially arranged such that certain boundaries or edges in the macro image align with selected fine lines or edges in the micro image. Thus when the camouflage is viewed at close range, the line or boundary of the macro image can be explained by fine edges in the more dominant micro pattern, reducing the saliency of the macro image. The reverse is also true, i.e. fine edges of the micro pattern that are visible at macro range are comprehendible as part of the macro camouflage image.

The influence of one spatial channel on the other may be further minimized by introducing color in only one of the patterns. For example, introducing color into the high spatial channel micro pattern can add to the perception of the low spatial channel macro pattern displayed in grey scale as being simply shadows. Cutoff frequency selection can also have a significant effect on interpretation of the hybrid camouflage. The amount of overlap in cutoff frequencies may be optimized to enhance image independence, and to produce a cleaner transition from one spatial channel to another.

The micro and macro patterns of a multi-range camouflage may be any new or existing design, pattern, drawing, or image, or any combination thereof. For example, a pattern may comprise a known military camouflage pattern, a photographic image, a computer generated image, or a computer altered photograph, among other things. A pattern may be selected or configured to be particularly effective over a defined distance range, and in a specific environment or region. In one embodiment, information such as geographic location or type of terrain is used to create a computer generated pattern comprising an arrangement of lines or other shapes of appropriate scale and orientation. A desired pattern may be scanned if necessary, or otherwise saved in digital form on a computer readable memory or storage device.

The anticipated use of the camouflage may also factor into the definition of the patterns. For example, the appearance of a certain type of landscape or environment may have a noticeable directional quality to it. More specifically, the overall appearance of an arid or desert type landscape tends to be relatively horizontal, while forested or tropical landscapes present more vertical lines. The selection and arrangement of the micro or micro pattern may be tailored to help capture such optical features.

For patterns based on photographs, information stored with each photograph may additionally include the date, time, and location at which the photograph was taken. The location information may comprise for example the precise GPS coordinates in the form of latitude, longitude, and elevation. The photographs may be organized according to specific country, geographic region, or the type of landscape environment, such as arid, cultivated, forested, tropical, alpine, or urban environments. Various other image organization schemes are possible and contemplated within the scope of the present invention.

Image selection may involve first selecting a particular catalog from which to choose an image, or selecting a particular group of images in a catalog from which to choose an image. In one exemplary embodiment, an image catalog containing photographs representative of the type of region or landscape associated with the micro or macro pattern is selected. In another exemplary method, an image catalog is selected that contains photographic images from the actual region or landscape where the camouflage is expected to be deployed. In still another embodiment, a group of images is selected from one or more catalogs based on GPS coordinate information, and the proximity of the image's coordinates to a pre-selected location, such as a known deployment location.

The same techniques described herein for developing a camouflage design that produces dual-range could be further utilized to construct a hybrid image camouflage that further produces a third, much longer range pattern. Moreover, the technique could be applied any number of times to produce a hierarchy of camouflage patterns, each exponentially larger and more distant than the preceding level.

The above described embodiments and elements of a hybrid image camouflage and method may comprise a computer executable algorithm embodied in a computer program. A suitable computer program may be adapted to access stored digital image information related to micro or macro patterns, and perform any or all of filtering functions described herein to produce a hybrid image camouflage. The results may be displayed or stored, and the effect of various combinations of input parameters and control settings may be evaluated by simply re-executing the program.

For the purposes of describing and defining the present invention it is noted that the use of relative terms, such as "substantially", "generally", "approximately", and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under §112, 6th paragraph is not intended. Additionally, it is not intended that the scope of patent protection afforded the present invention be defined by reading into any claim a limitation found herein that does not explicitly appear in the claim itself.

What is claimed is:

1. A method of using hybrid image techniques to effect a transformation of stored digital images into a composite digital camouflage image, comprising:
    applying a high pass filter to a first stored digital image to create a high spatial frequency pattern, the first stored digital image selected to provide a camouflage effect when viewed at a first viewing distance;
    applying a low pass filter to a second stored digital image to create a low spatial frequency pattern, the second stored digital image selected to provide a camouflage effect when viewed at a second viewing distance greater than the first viewing distance; and
    combining the high and low spatial frequency patterns to create a composite digital image, wherein the appearance of the first stored digital image predominates the composite digital image when viewed at the first viewing distance, and the appearance of the second stored digital image predominates the composite digital image when viewed at the second viewing distance.

2. The method of claim 1, further comprising minimizing grouping cues in the low spatial frequency pattern relative to grouping cues in the high spatial frequency pattern.

3. The method of claim 1, further comprising arranging the patterns such that selected geometrical features of the low spatial frequency pattern align with selected geometrical features of the high special frequency pattern.

4. The method of claim 2, wherein minimizing the grouping cues in the low spatial frequency pattern relative to grouping cues in the high spatial frequency pattern comprises avoiding symmetry and repetitiveness in the low spatial frequency pattern.

5. The method of claim 1, wherein a cutoff frequency is associated with each of the high and low pass filters, and the overlap of the cutoff frequencies is minimized.

6. The method of claim 1, wherein the high spatial frequency pattern includes color, and the low spatial frequency pattern is in grey scale.

7. The method of claim 1 wherein the first stored digital image is a known military camouflage pattern.

8. The method of claim 1 wherein the high spatial frequency pattern comprises primarily fine features, and the low spatial frequency pattern comprises primarily coarse features.

9. The method of claim 1, wherein at least one of the first and second stored digital images is a photograph.

10. The method of claim 1, wherein the first viewing distance corresponds to a lower portion of a desired effective concealment range, and the second viewing distance corresponds to a higher portion of the desired effective concealment range.

11. The method of claim 10, wherein the desired effective concealment range is between about 30 and 300 feet.

12. A method of generating a composite digital camouflage image suitable for use on clothing, by employing hybrid image techniques to effect a transformation of stored digital images, the method comprising:
  applying a high pass filter to a first stored digital image to create a high spatial frequency pattern, the first stored digital image selected to provide a concealment effect when viewed at a first viewing distance;
  applying a low pass filter to a second stored digital image to create a low spatial frequency pattern, the second stored digital image selected to provide a concealment effect when viewed at a second viewing distance greater than the first viewing distance; and
  combining the high and low spatial frequency patterns to create a composite digital image, wherein the appearance of the first stored digital image predominates the composite digital image when viewed at the first viewing distance, and the appearance of the second stored digital image predominates the composite digital image when viewed at the second viewing distance.

13. The method of claim 12, wherein the high spatial frequency pattern comprises color, and the low spatial frequency pattern is in grey scale.

14. The method of claim 12, wherein the first viewing distance corresponds to a lower portion of a desired effective concealment range, and the second viewing distance corresponds to a higher portion of the desired effective concealment range.

15. The method of claim 12, wherein the clothing is a military uniform, and the first and second stored digital images are known military camouflage patterns.

* * * * *